United States Patent [19]
Fujan et al.

[11] Patent Number: 5,333,895
[45] Date of Patent: Aug. 2, 1994

[54] DUAL REAR AXLE SYSTEM FOR LARGE VEHICLES

[75] Inventors: Steven J. Fujan; Frederick W. Loeber, both of Tulsa, Okla.

[73] Assignee: Terex Corporation, Green Bay, Wis.

[21] Appl. No.: 805,531

[22] Filed: Dec. 11, 1991

[51] Int. Cl.$^5$ ............................................. B60G 5/00
[52] U.S. Cl. .................................... 280/676; 180/22
[58] Field of Search ...................... 280/676, 683, 81.5, 280/684, 685, 687, 688; 180/22, 24.01, 24.11

[56] References Cited

U.S. PATENT DOCUMENTS

| | | | |
|---|---|---|---|
| 1,565,527 | 12/1925 | Templin | 180/24.11 |
| 1,761,135 | 6/1930 | LeMoon | 280/680 |
| 2,613,954 | 10/1952 | Avila | 180/22 |
| 3,147,024 | 9/1964 | Brockman | 280/683 |
| 4,717,170 | 1/1988 | Mounier-Poulat et al. | 180/24.01 |
| 5,088,570 | 2/1992 | Loeber | 180/24.01 |
| 5,163,700 | 11/1992 | Loeber | 280/676 |

FOREIGN PATENT DOCUMENTS 0082879  4/1988  Japan .................................. 280/676

Primary Examiner—Mitchell J. Hill
Assistant Examiner—Paul Dickson
Attorney, Agent, or Firm—Head & Johnson

[57] ABSTRACT

A dual rear axle system for large vehicles in which the vehicle has a frame, and the axle system includes a forward axle housing, a draft arm having one arm affixed to the forward axle housing and the other arm pivotally affixed to the vehicle frame, a rearward axle housing spaced from and parallel to the forward axle housing, an axle extending through both axle housings having wheels and tires thereon, an upper linkage having one end pivotally attached to the upper portion of the forward axle housing and the other end pivotally attached to the upper portion of the rearward axle housing, lower linkage having one end pivotally attached to the lower portion of the forward axle housing and the other end pivotally attached to the lower portion of the rearward axle housing so that the axle housings are supported in spaced apart relationship with the axle housings independently free to move in vertical planes and compressible strut members extending between the axle housings and the frame for spring supporting the frame.

6 Claims, 2 Drawing Sheets

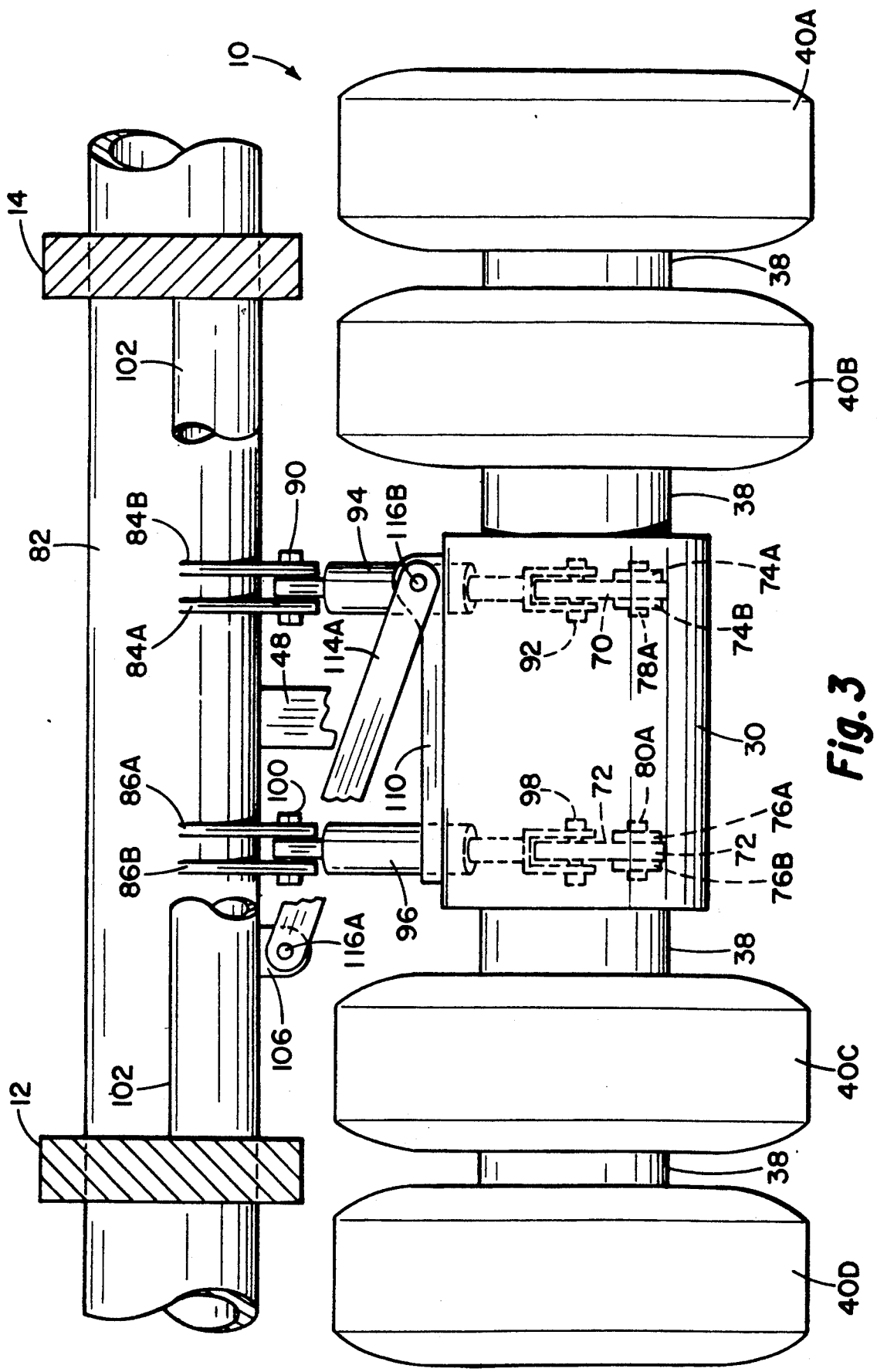

DUAL REAR AXLE SYSTEM FOR LARGE VEHICLES

BACKGROUND OF THE INVENTION

This invention relates to a dual system for large vehicles. The invention is particularly useful for large off-road vehicles, such as trucks used for carrying extremely large loads. These type of trucks are customarily used in surface and open pit mining, earth moving and so forth. Such large off-road trucks are required not only to carry large loads but to move at fairly high speeds and typically over rough ground, that is, they do not typically travel on paved roads. Even in projects where some potions of the vehicle travel is over road surfaces that are maintained, the usual application includes at least some surfaces that are not maintained. In other words, these large off-road trucks must carry heavy loads at fairly high speeds over uneven terrain. For this reason, the axle arrangement and suspension system must be arranged to achieve two basic objectives, that is, support extremely heavy loads and, second, to provide suspension and mounting systems for the axle assemblies that support such heavy loads without transferring to the vehicle frame excessive shock from uneven terrain.

For reference to types of vehicles to which the present disclosure relates, reference may be had to U.S. patent application No. 07/650,442, entitled "Steerable Rear Dual Axle System For Large Trucks." now U.S. Pat. No. 5,088,570. Such disclosure describes a dual axle system for large trucks, as does the present disclosure. The dual axle system described in U.S. patent application No. 07/650,442 now U.S. Pat. No. 5,088,570 is steerable, that is, provision is made for changing the angular relationship between dual rear axles to coordinate with the vehicle front steering system. The present disclosure provides a system for dual rear axles but in which the rear axles are not steerable and in which the vertical planes of dual rear axle movements stay substantially parallel to each other and perpendicular to the longitudinal axis of the truck frame.

It is an object of this disclosure to provide an improved dual rear axle assembly for large vehicles. More particularly, an object of this invention is to provide a dual rear axle assembly specifically useful for axles that include large cylindrical axle housings designed for mounting therein electric drive systems, with axles extending from the electric drive systems. An important aspect of this disclosure is the provision of a dual rear axle assembly for large trucks including forward and rearward axle housings wherein the axle housings are supported in a manner to permit independent motion in vertical planes of the axles, while maintaining the planes of vertical motion substantially parallel to each other and in a system that is characterized by simplicity, economy, and durability.

SUMMARY OF THE INVENTION

A dual rear axle system for large vehicles includes a vehicle frame with a longitudinal axis in the direction of normal travel. The frame has a front end and a rear end.

A forward axle housing has an axis and opposed ends and has an upper portion and a lower portion. The forward axle housing typically is formed of a relatively large diameter cylindrical member particularly adaptable for mounting therein electric drive systems.

A draft arm has one end affixed to the forward axle housing and the other end pivotally affixed to the vehicle frame in the direction toward the frame front end. In this manner the forward axle housing is supported so that it can pivot in a vertical plane that is perpendicular to the frame longitudinal axis.

A rearward axle housing is provided that may be substantially identical to the forward axle housing. The rearward axle housing has opposed ends and upper and lower portions and is spaced from the forward axle housing. The axii of the forward and rearward axle housings are parallel to each other and in vertical planes perpendicular to the vertical plane of the frame longitudinal axis.

An axle rotatably extends from each end of each of the forward and rearward axle housings, and the axle housings include means providing rotational motive or braking forces to the axles for moving or stopping the vehicle on which the dual rear axle assembly is used.

Wheels are mounted on the outer ends of the axles and the wheels may be singular or dual. Thus with dual axles and dual wheels at the end of each axle, the assembly supports eight wheels and thereby eight tires on the wheels.

An upper linkage has opposed ends, one end being pivotally attached to the upper portion of the forward axle housing and the other end pivotally attached to the upper portion of the rearward axle housing.

A lower linkage has opposed ends, one end being pivotally attached to the lower portion of the forward axle housing and the other end being pivotally attached to the lower portion of the rearward axle housing. In the preferred arrangement, the upper linkage may be formed of a single link affixed to both the forward and rearward axle housings intermediate their ends, while the lower linkage is in the form of two links affixed to the forward and rearward axle housings adjacent the opposed ends thereof.

Spring support is provided between the axle housings and the frame. The spring support may be in the form of compressible strut members extending between the vehicle frame and the axle housings.

A first panhard bar is pivotally attached at one end to the frame and the other end to the forward axle housing and is supported in a plane of the forward axle housing axis that is perpendicular the frame longitudinal axis. In like manner, a second panhard bar pivotally extends between the frame and the rearward axle housing in the plane of the rearward axle housing axis. The panhard bar serves to maintain the dual axle assembly in proper position beneath the frame but allows free vertical movement of the axle housings with respect to the frame.

A better understanding of the invention will be obtained from the following description of the preferred embodiment, taken in conjunction with the attached drawings.

DESCRIPTION OF THE DRAWINGS

FIG. 2 shows struts employed for a spring mount system to which the vehicle frame is supported by the dual rear axle assembly.

FIG. 3 is a rearward view as taken along the line 3—3 of FIG. 2 showing more details of the arrangement of the spring support system and of the panhard bar for maintaining the dual rear axle assembly in proper position below the truck frame. In this view the axles extending from the rear axle housing are shown with tires as mounted on wheels supported to the axles.

DESCRIPTION OF THE PREFERRED EMBODIMENTS

Figure 1:
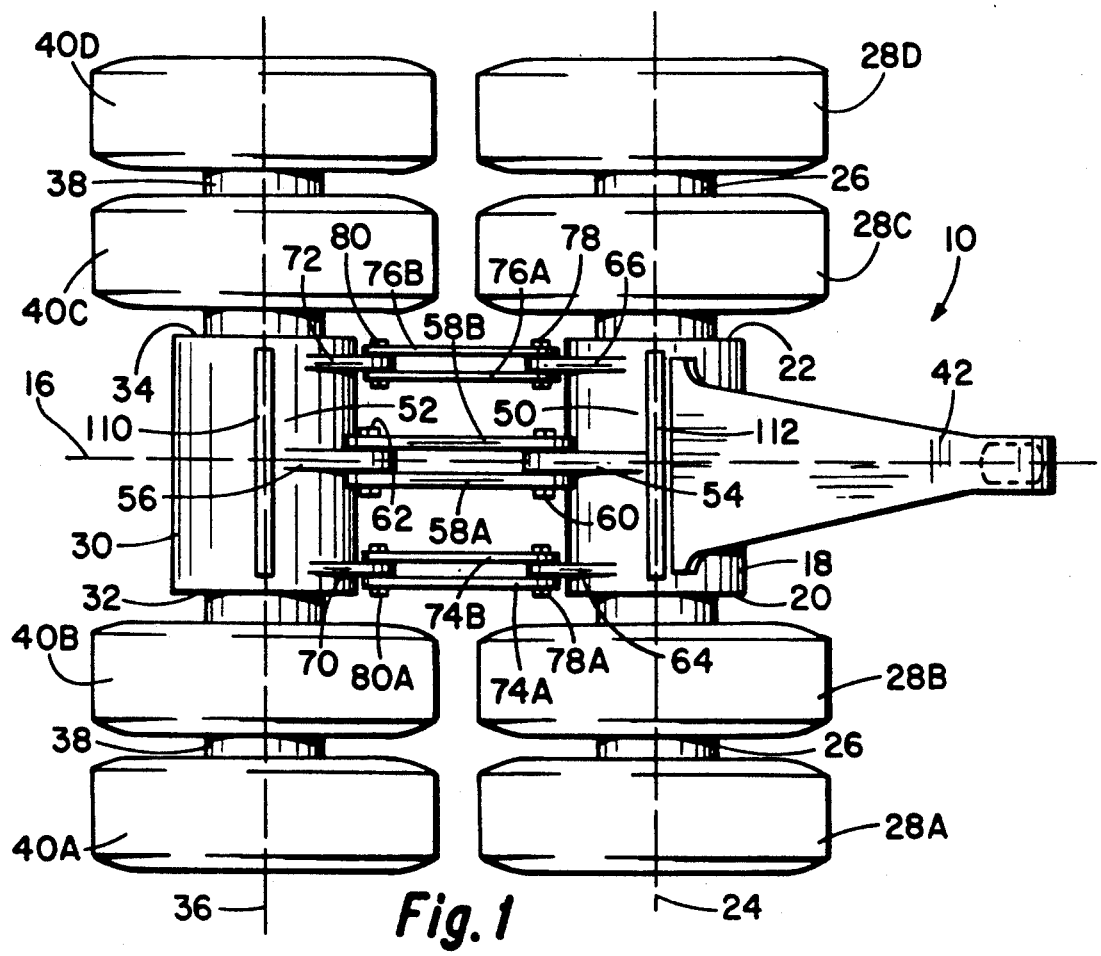
FIG. 1 is a top plan view of a dual rear axle assembly for use as a part of a large off-road vehicle showing only the assembly without the vehicle frame and without the spring suspension system.

Referring to the drawings, the rear dual axle assembly for large vehicles is indicated generally by the numeral 10. Such assembly is used with a truck frame illustrated diagrammatically by longitudinal members 12 and 14 that are shown in highly simplified arrangement for exemplary purposes only. The frame members 12 and 14 extend longitudinally and the frame has a longitudinal axis 16, as seen in FIG. 1, extending in the forward and rearward direction in the vehicle normal direction of travel. Frame members 12 and 14 are exemplary since vehicle frames, particularly for large heavy-load carrying vehicles, are an extremely complex and highly engineered piece of equipment and are usually contoured according to the load carrying structure to be used with the truck, such as a dump truck or the like. Frame members 12 and 14 are illustrated merely to indicate that the dual rear axle assembly 10 of this disclosure is used with a frame structure.

The dual rear axle assembly includes a forward axle housing 18 having opposed ends 20 and 22. The forward axle housing has an axis 24 as seen in FIG. 1. In the illustrated arrangement for practicing this invention, forward axle housing 18 is a relatively large diameter tubular member of the type that is adaptable to receive therein electric motor drive systems that support a forward rear axle 26 that extends from the opposite ends 20 and 22 of the axle housing. Axle 26 supports wheel assemblies having tires 28A through 28D. Axle 26 and tires 28A through 28D rotate about axis 24.

The dual axle assembly 10 further includes a rearward axle housing 30 that is substantially a duplicate of forward axle housing 18. The rearward axle housing has ends 32 and 34, and has an axis 36. The rearward axle housing supports a rearward rear axle 38 that extends from both ends 32 and 34 of rearward axle housing 30. Mounted on rearward rear axle 38 are wheel structures and tires 40A through 40D. Thus, it is seen that by use of dual tires and dual rear axles the assembly supports eight wheels and tires, however, the invention could be practiced with single rather than dual wheels and tires so that only four wheels and tires are employed. Further, the invention can be used whether or not the forward and the rearward axle housings 18 and 30 are large cylindrical members, as illustrated, or are of the type of axle housings that are not required to support electric drive means therein. That is, the principles of this invention apply whether or not axle housings 18 and 30 support integral drive means therein, however, the invention is particularly applicable to the arrangement illustrated wherein the axle housings are of large diameter.

A draft arm 42 has one end 44 affixed to the forward axle housing 18. The forward end of the draft arm has an opening 46 therein for pivotally receiving a frame cross-member structure, not shown, that is supported by a downwardly extending bracket 48 forming a part of the vehicle frame. The draft arm 42 may be of the type illustrated and described in U.S. Pat. No. 4,629,211 entitled, "Frame And Axle For Heavy Duty Trucks." A nose cone bearing is used to receive opening 46 in the draft arm, and for reference to an improved type of nose cone bearing arrangement, see co-pending U.S. application No. 07/624,968 entitled "Nose Cone Bearing Arrangement" now U.S. Pat. No. 5,085,520.

The draft arm 42 is preferably a fabricated structural member of generally triangular configuration, as shown in the plan view of FIG. 1, in which the rearward end 44 is wide at the point of attachment to the forward axle housing. In this manner, forward axle housing 18 is secured to vehicle frame 12, 14 so that motive force or braking force can be applied from the dual rear axle assembly 10 to the truck frame.

Front axle housing 18 has an upper portion 50 and in like manner, rearward axle housing 30 has an upper portion 52. Affixed to the axle housings at the upper portions 50 and 52 are brackets 54 and 56. Specifically, bracket 54 is affixed to upper portion 50 of forward axle housing 18, is spaced midway between axle housing ends 20 and 22, and extends rearwardly from the housing. Bracket 56 is affixed to upper portion 52 of rearward axle housing 30, extends in the forward direction and is placed intermediate axle housing ends 32 and 34. Thus, brackets 54 and 56 are in the same vertical plane of the rear axle assembly and are in the vertical plane of the vehicle frame longitudinal axis 16.

An upper linkage means is provided to pivotally interconnect brackets 54 and 56. This is accomplished by link arms 58A and 58B to form a single upper link arm. The forward ends of link arms 58A and 58B pivotally connect to bracket 54, and the rearward ends pivotally connect to bracket 56. This pivotal connection is achieved by pins 60 and 62. Instead of the use of pins 60 and 62 link arms 58A and 58B may be connected by use of ball joints or other swivel-type joint connections.

Secured to the forward axle housing 18 adjacent first end 20 is a bracket 64 that is in a vertical plane. Bracket 64 extends from adjacent the forward axle housing bottom portion 66 upwardly in a vertical plane. In like manner, bracket 66 is affixed to the forward axle housing 18 adjacent end 22 and extends rearwardly in a vertical plane.

Rearward axle housing 30 has a bottom portion 68. A first bracket 70 is affixed to rearward axle housing 30 and extends forwardly in a vertical plane adjacent axle housing end 32. A second bracket 72 is affixed to rearward axle housing 30 adjacent end 34 and extends in a vertical plane.

Thus, brackets 66 and 72 extend toward each other in the same vertical plane and in like manner, brackets 64 and 70 are in the same vertical plane and extend toward each other. A lower linkage means is provided for interconnecting the pairs of brackets 64, 70 and 66, 72. This linkage means is illustrated in the form of link arms 74A and 74B that interconnect brackets 64 and 70, and link arms 76A and 76B that interconnect brackets 66 and 72. The interconnection between the link arms and the brackets is pivotal, that is, the interconnection allows free pivotation in a vertical plane and limited amount of pivotation in the horizontal plane and is exemplified by pins 78, 78A, 80 and 80A. Instead of pins, the pivotal connections between the brackets and the link arms may be by ball joints or other type of connections that permit spherical motion alignment under load.

Figure 2:
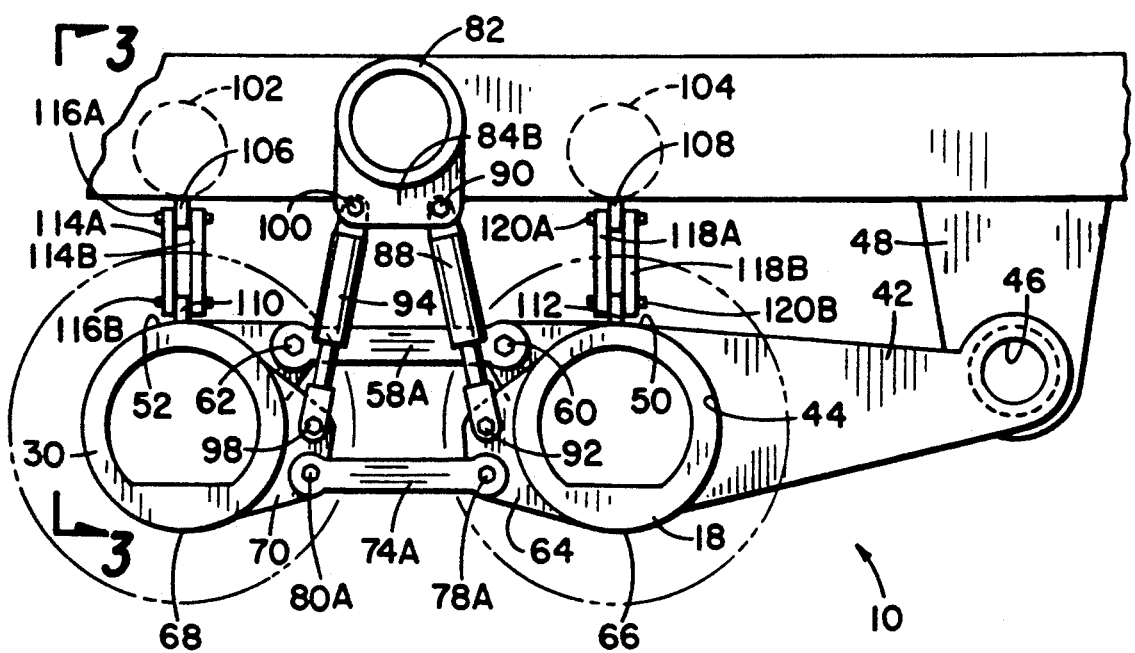
FIG. 2 is an elevational view of the dual axle assembly of FIG. 1 showing the tires in dotted outline and showing the axle housings without the axles extending therefrom.

The upper link arms 58A and 58B thereby extend essentially from the axle housing upper portions 50 and 52 while the lower link arms 74 and 76 generally extend from the axle housing lower portions 66 and 68 as best seen in FIG. 2.

The system of link arms ,58, 74 and 76 interconnect the axle housings and maintain the axle housings in spaced apart relationship wherein the axii 24 and 36 of the axle housings are supported in vertical planes, but in which the axii can oscillate with respect to each other in their vertical planes.

Means must be provided to spring support vehicle frame 12, 14 with respect to the dual rear axle assembly 10. This can be achieved in a variety of ways but in the illustrated and preferred arrangement, the frame has a cross member 82, as seen in FIGS. 2 and 3. The frame has downwardly extending brackets 84A and 84B that are spaced either side of the vertical plane of brackets 64 and 70 affixed to the axle housings. Similarly, the crossmember support has brackets 86A and 86B that extend downwardly to either side of the vertical plane for brackets 66 and 72 affixed to the rear axle housings. Extending between brackets 84A, 84B and bracket 64 is a spring support mechanism in the form of a strut assembly 88. The strut assembly is pivotally attached at its upper end by pin 90 to the vehicle frame and the lower end of strut assembly 88 is attached to bracket 64 by means of a pin 92. In like manner, a second strut member, not seen, extends from brackets 86A and 86B to bracket 66.

A pair of strut members 94 and 96 extend from brackets 84A, 84B and 86A and 86B to the rearward axle housing brackets 70 and 72.

Struts 88, 94 and 96 (as well as the one not seen) may be of the type as described in U.S. Pat. No. 4,863,147 issued Sep. 5, 1989 and entitled "Vehicle N2/Oil Suspension With External Damping Orifice Adjustment."

The pin that holds the lower end of strut 96 to bracket 72 is identified by the numeral 98, and the pin that holds the upper end of strut 96 to brackets 86A and 86B is identified by the numeral 100.

Draft arm 42 serves to maintain the dual rear wheel assembly 10 in proper position longitudinally beneath frame 12, 14 but some means is required to maintain the assembly in proper position laterally. This is achieved by the use of a pair of panhard bars. Extending between frame portions 12, 14 are supplementary cross members 102 and 104, 104 appears in dotted outline in only FIG. 2. FIG. 3 shows supplementary cross member 102 broken away to reveal more details of the assembly. The supplementary cross members 102 and 104 are illustrated as means of anchoring the panhard bars to the frame. Extending downwardly from cross member 102 is a bracket 106 and from cross member 104, a bracket 108 (see FIG. 2). Extending upwardly in the vertical plane of bracket 106 is a bracket 110 that is attached to rearward axle housing upper portion 52. In like manner, a bracket 112 extends upwardly from the forward axle housing upper portion 50. Bracket 112 is in the vertical plane of bracket 108.

Extending between brackets 106 and 110 is a rearward panhard bar made up of parallel lengths 114A and 114B that are pivotally supported by pins 116A and 116B. In like manner, a forward panhard bar consists of two lengths 118A and 118B pivotally supported at one end to bracket 108 by pin 102A and to bracket 112 by pin 120B. The forward and rearward panhard bars maintain the axle housings 18 and 30 in proper lateral position beneath the vehicle frame but permit free vertical displacement of the axle housings relative to the frame.

The dual rear axle assembly 10 has advantages over other known types of rear dual axle arrangements. First, the assembly is arranged in such a way that each of the four wheels or four sets of wheels, as illustrated, can rise and fall vertically irrespective of the displacement of the other three wheels or sets of wheels. In addition, each axle housing 18 and 30 can as a whole rise or fall vertically independently of the other axle housing. Further, the entire assembly is free to pivot in vertical planes perpendicular to the vehicle longitudinal axis.

A great advantage of the dual rear axle assembly 10 as herein described is its economy and simplicity. The use of upper link arms 58A, 58B and lower link arms 74A, 74B, 76A and 76B to interlink the forward and rearward axle housings is accomplished in a manner of utmost simplicity and economy of construction. While significant economy and simplicity of construction are achieved, the dual axle system also has other significant engineering advantages. One of the important aspects of the system is that it is self-counteracting with respect to ground forces, that is, the weight applied to forward axle housing 18 is reacted by rearward axle housing 30 and strut 88 (as well as the one not seen) rather than draft arm 42 and the nose cone bearing within opening 46. In the same way, weight applied to rearward axle housing 30 is reacted by the forward axle housing 18 and struts 94, 96. This characteristic of the assembly to self counteract greatly simplifies the connection of the assembly to the frame and reduces stress, strain and wear on the connections between the axle assembly and the frame.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A dual rear axle system for large vehicles comprising:

a frame with a longitudinal axis in the direction of normal travel, the frame having a front end and a rear end;

a forward axle housing having an axis and opposed ends and having an upper portion and a lower portion;

a single draft arm having one end affixed to said forward axle housing midway between said opposed ends and the other end pivotally affixed to said frame in the direction towards said frame front end;

a rearward axle housing having an axis and opposed ends, the rearward axle housing being spaced from said forward axle housing and their axii being parallel to each other and in vertical planes perpendicular to a vertical plane of said frame longitudinal axis, the rearward axle housing having an upper portion and a lower portion;

axle means rotatably supported by both said forward and rearward axle housings;

wheel means secured to said axle means;

a single upper link arm having forward and rearward ends, said forward end being pivotally attached to said upper portion of said forward axle housing midway between said opposed ends thereof and said link arm rearward end being pivotally attached to said upper portion of said rearward axle housing midway between said opposed ends thereof;

lower linkage means having opposed ends, one end being pivotally attached to said lower portion of said forward axle housing and the other end being pivotally attached to said lower portion of said rearward axle housing; and means providing resilient support between said forward and rearward axle housings and said frame to thereby transfer weight from said frame to said forward and rearward axle housings.

2. A dual rear axle system for large vehicles according to claim 1 wherein said lower linkage means is in the form of first and second spaced apart lower link arms, the lower link arms being pivotally attached to said lower portions of said forward and rearward axle housings adjacent said opposed ends thereof.

3. A dual axle system for large vehicles according to claim 1 wherein said means providing resilient support between said forward and rearward axle housings and said frame includes:

a pair of spaced apart resilient means interposed between attachment points on said forward axle housing and said frame; and a second pair of spaced apart resilient support means interposed between attachment points on said rearward axle housing and said frame.

4. A dual rear axle system for large vehicles according to claim 3 wherein each said resilient support means is in the form of a telescopically compressible strut member.

5. A dual rear axle system for large vehicles according to claim 1 including:

a first elongated panhard bar having first and second ends, the first end being pivotally connected to said forward axle housing, the second end being pivotally connected to said frame, said first panhard bar being supported for pivotation in a vertical plane perpendicular to said frame longitudinal axis and serving to maintain said forward axle housing in vertical position below said frame.

6. A dual rear axle system for large vehicles according to claim 5 including:

a second elongated panhard bar having first and second ends, the first end being pivotally connected to said rearward axle housing, the second end being pivotally connected to said frame, said second panhard bar being supported for pivotation in a vertical plane perpendicular to said frame longitudinal axis and serving to maintain said rearward axle housing in vertical position below said frame, said first and second panhard bars being supported in paralleled planes.

* * * * *